(12) United States Patent
Koza et al.

(10) Patent No.: US 9,244,775 B2
(45) Date of Patent: Jan. 26, 2016

(54) REDUCING READING OF DATABASE LOGS BY PERSISTING LONG-RUNNING TRANSACTION DATA

(71) Applicant: International Business Machines Corporation, Armonk, NY (US)

(72) Inventors: Phillip R. Koza, San Jose, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 212 days.

(21) Appl. No.: 13/803,018

(22) Filed: Mar. 14, 2013

(65) Prior Publication Data

US 2014/0279907 A1 Sep. 18, 2014

(51) Int. Cl.
G06F 7/02 (2006.01)
G06F 17/30 (2006.01)
G06F 11/14 (2006.01)

(52) U.S. Cl.
CPC ...... *G06F 11/1451* (2013.01); *G06F 17/30088* (2013.01); *G06F 17/30368* (2013.01); *G06F 17/30575* (2013.01)

(58) Field of Classification Search
CPC ............ G06F 11/1471; G06F 11/1469; G06F 17/30368; G06F 11/1446; G06F 11/1451; G06F 17/30088; G06F 11/1474
See application file for complete search history.

(56) References Cited

U.S. PATENT DOCUMENTS

| | | | |
|---|---|---|---|
| 6,032,158 A * | 2/2000 | Mukhopadhyay et al. | 1/1 |
| 6,631,374 B1 | 10/2003 | Klein et al. | |
| 6,732,124 B1 | 5/2004 | Koseki et al. | |
| 7,133,884 B1 * | 11/2006 | Murley et al. | 1/1 |
| 7,801,852 B2 | 9/2010 | Wong et al. | |
| 8,332,365 B2 * | 12/2012 | McAlister et al. | 707/674 |
| 2008/0027987 A1 | 1/2008 | Arora et al. | |
| 2009/0037494 A1 | 2/2009 | Wong et al. | |
| 2009/0177709 A1 | 7/2009 | Zou et al. | |
| 2010/0082529 A1 | 4/2010 | Mace et al. | |

* cited by examiner

*Primary Examiner* — Bruce Moser
(74) *Attorney, Agent, or Firm* — Susan Murray; SVL IPLaw Edell, Shapiro & Finnan, LLC

(57) ABSTRACT

According to one embodiment of the present invention, a system reduces re-reading of database logs by persisting long running transaction data. The system processes the database log records of the database transaction log; generates a snapshot of the database log records at periodic intervals, wherein each snapshot includes database log records for pending transactions; and in response to an interruption in processing of the database log records, utilizes a snapshot to restore database log records for the pending transactions and resume processing of the database transaction log from a position succeeding the database log records of the selected snapshot.

14 Claims, 6 Drawing Sheets

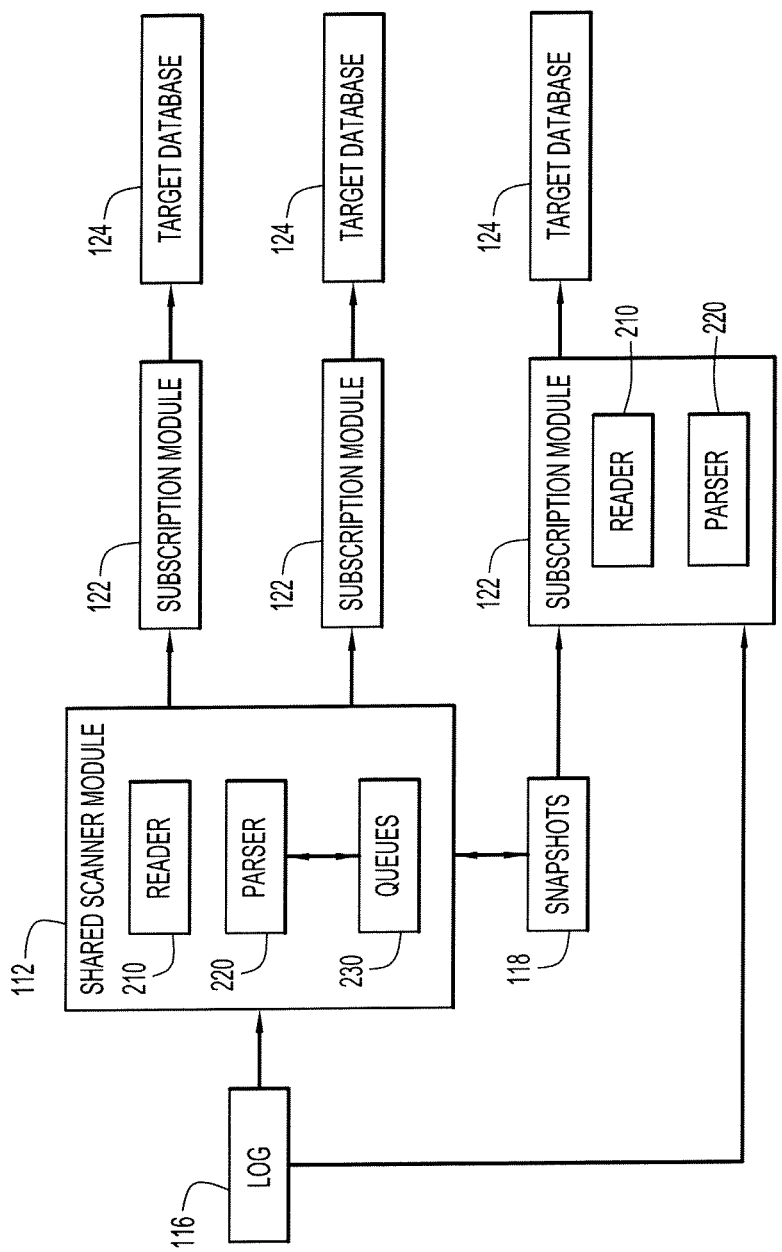

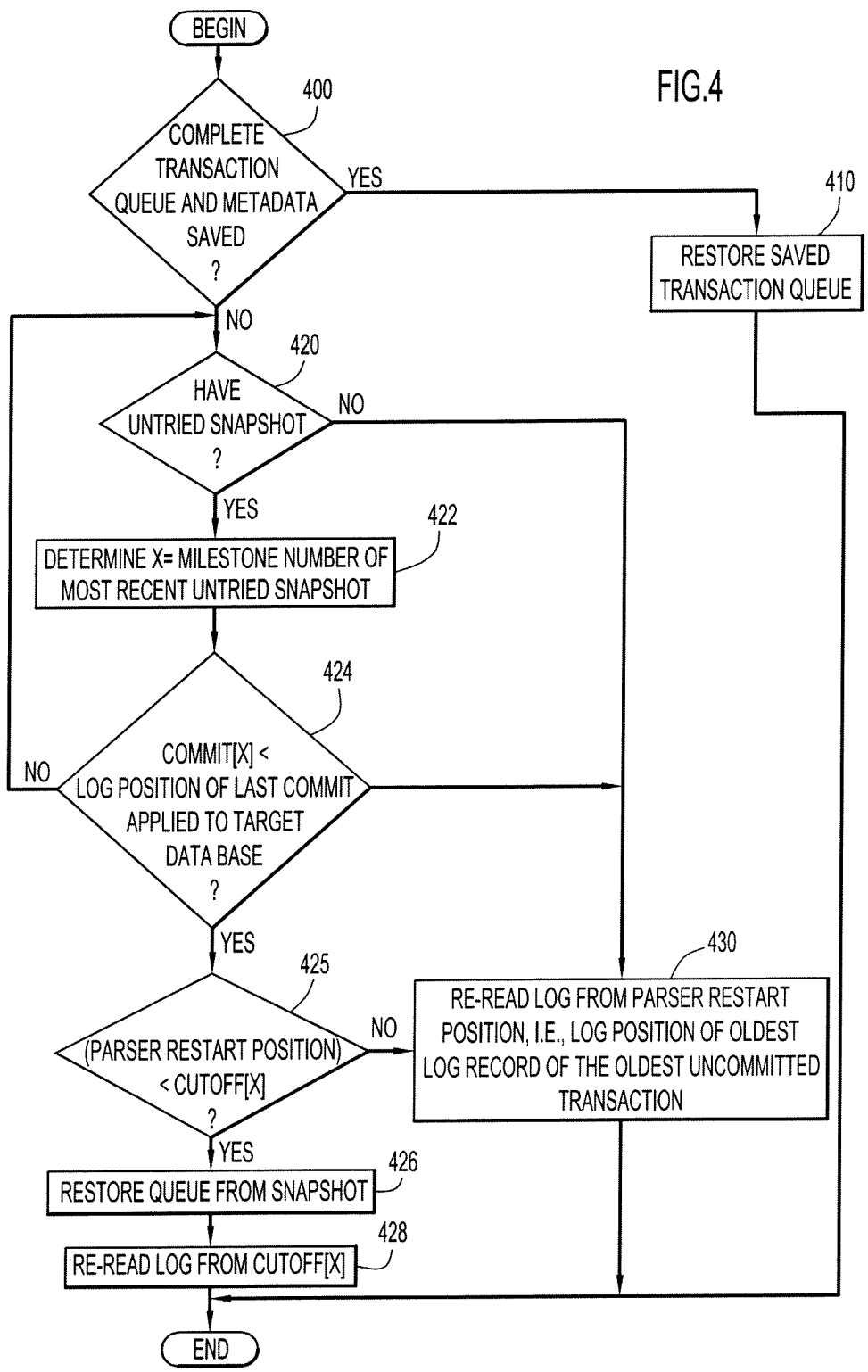

REDUCING READING OF DATABASE LOGS BY PERSISTING LONG-RUNNING TRANSACTION DATA

BACKGROUND

1. Technical Field

Present invention embodiments relate to change data capture, and more specifically, to reducing re-reading of database logs by persisting long running transaction data.

2. Discussion of the Related Art

Change data capture (CDC) products read the log of a database (the source database or source) to determine what changes have been made to the database. Action can then be taken on the basis of these changes. In particular, the changes can be replicated in a copy of the database (the target database or target). Only committed transactions of the source database are replicated in the target. As log records are read, they are stored according to the transaction they are part of. Each transaction is stored in its own in-memory queue or list. When the commit log record for a transaction is seen, the transaction is applied to the target database. Thus, transactions are applied to the target in commit order, and the log position of the last commit applied indicates how far the replication has progressed. This is called the commit position.

From time to time, a CDC process will shut down. Later the process must resume in a manner that preserves data integrity. If the process is able to shut down gracefully, it can save the in-memory transaction queue data to disk before terminating. This information is restored at restart, and log reading can begin from the last log record previously read. However, if the process stops in a non-graceful manner, the transaction queue data will be lost, and some log data will have to be re-read in order to guarantee that all desired changes to the source are captured. If a non-graceful shutdown occurs while a long-running transaction is in progress, relevant entries may be far back in the log. As a result, a large amount of log data has to be reprocessed.

BRIEF SUMMARY

According to one embodiment of the present invention, a system reduces re-reading of database logs by persisting long running transaction data. The system processes the database log records of the database transaction log; generates a snapshot of the database log records at periodic intervals, wherein each snapshot includes database log records for pending transactions; and in response to an interruption in processing of the database log records, utilizes a snapshot to restore database log records for the pending transactions and resume processing of the database transaction log from a position succeeding the database log records of the selected snapshot. Embodiments of the present invention further include a method and computer program product for processing database log records in substantially the same manner described above.

BRIEF DESCRIPTION OF THE SEVERAL VIEWS OF THE DRAWINGS

Generally, like reference numerals in the various figures are utilized to designate like components.

FIG. 2 is a block diagram of a shared scanner module and subscription modules according to an embodiment of the present invention.

FIG. 4 is a procedural flow chart illustrating an example manner of restarting a shared scanner module according to an embodiment of the present invention.

DETAILED DESCRIPTION

Figure 1:
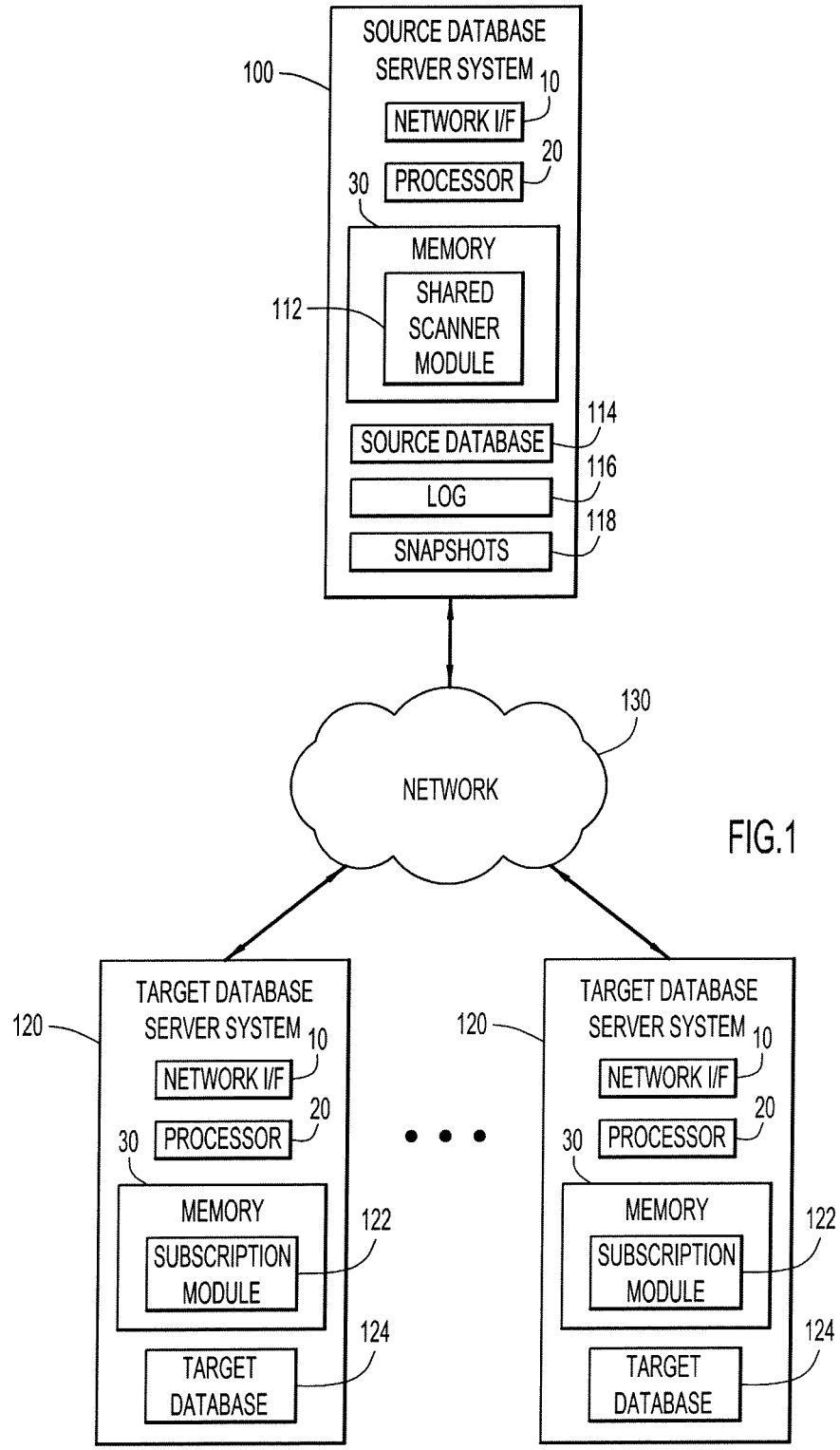
FIG. 1 is a diagrammatic illustration of a computing environment for an embodiment of the present invention.

Change data capture (CDC) products read the log of a source database to determine what changes have been made to the database. Action can then be taken on the basis of these changes, e.g., the changes can be replicated in a target database. A user may configure the system to act only on the basis of specified changes, e.g., to replicate only changes that affect specified tables. A log entry for a specified change (e.g., a change to a specified table), or a log entry that is always needed (e.g., a begin transaction record or a commit record), is referred to as "in-scope." The log reader ignores any log entries that are not in-scope. As in-scope records are received from the log, they are placed in an in-memory queue corresponding to the transaction to which they belong. Each pending transaction has its own queue. When the log record for a commit operation is received, the transaction is applied to the target database, and the transaction's queue is released.

After a CDC process shuts down non-gracefully (i.e., without saving its in-memory transaction queues), it must resume in a manner that preserves data integrity. One way it can do this is by re-reading the log beginning with the first record of the oldest open transaction, i.e. the oldest transaction which has not aborted and for which the commit has not been successfully applied on the target. This is called the restart position. The necessary log position information is saved in a record (a "bookmark") from time to time, e.g., as transactions are applied to the target. Resuming in this manner guarantees that any in-scope log entries for these transactions are seen. Most transactions are typically short-lived (e.g., minutes). In these cases, the beginning of the oldest transactions will be fairly recent and will not be very far back in the log. But if the oldest transactions are long-running (e.g., hours, days, weeks, etc.), there can be a large amount of log data between the begin scanning point and the point in the log that contains the last commit that has been applied. It is fairly typical that these long-running transactions have very few in-scope log records. In many cases, the only in-scope log record will be a "begin transaction" log record. If this is not the first time this portion of the log is being read, the in-scope log records for those transactions for which the commit has already been applied are not needed. So in most cases, there will be very few in-scope log records that are still needed in this old log data. This results in a large amount of log data being read to recover a small amount of data that requires replication, which adversely affects performance.

An alternative to re-reading the log beginning with the first in-scope record of the oldest transaction would be to periodically save all transaction queue data to disk. However, this could entail writing a large amount of data that might only be needed if a crash or non-graceful stop occurred, and, in any case, could be very expensive.

An aspect of an embodiment of the present invention is to reduce re-reading of database logs by persisting (e.g., writing to disk or other durable storage) long running transaction data, while incurring minimal overhead, and therefore little performance penalty.

Embodiments of the present invention avoid having to re-read database logs to capture long-running transaction data by periodically persisting log records (and metadata) older than a certain cutoff to disk. This persisted data is referred to as a "snapshot". The cutoff is generally defined in such a way that, in most cases, there is nothing to persist to disk, and to minimize the amount of data that must be re-read upon restart. Upon restart, if replication stopped gracefully, the saved transaction queue data is restored. But if replication did not stop gracefully, an appropriate snapshot is restored and only records that are not older than the cutoff have to be re-read from the log. Data is restored in a manner such that no log records are lost, and no log records are duplicated.

In most CDC products, there can be more than one consumer of data from the log. These consumers are referred to as "subscriptions" in this document. Each subscription can have its own log record reader and parser. Alternatively, subscriptions can use a shared scanner module that reads and parses all log records needed by all subscriptions. According to one embodiment of the present invention, only the shared scanner module creates snapshots. Since the shared scanner module provides log records for all subscriptions, these snapshots can be used by any parser, including private parsers used by subscriptions, and of course the parser used by the shared scanner module.

An example computing environment for a present invention embodiment is illustrated in FIG. 1. Specifically, the environment includes a source database server system 110 and one or more target database server systems 120, which may be remote from one another and communicate over a network 130.

Network 130 may be implemented by any number of any suitable communications media (e.g., wide area network (WAN), local area network (LAN), Internet, intranet, etc.). Alternatively, any number of source database server systems 110 and target database server systems 120 may be local to each other, and communicate via any appropriate local communication medium (e.g., local area network (LAN), hardwire, wireless link, intranet, etc.).

Source database server system 110 includes shared scanner module 112, source database 114, log 116, and snapshots 118. Log 116 contains records of transactions against source database 114. Shared scanner module 112 reads and parses the log, provides consumers with log information about changes to source database 114, and periodically saves snapshots 118 of long-running transaction data.

Each target database server system 120 includes subscription module 122 and target database 124. Subscription module 122 consumes log information about changes to source database 114 and replicates the changes in target database 124.

Source database server system 110 and target database server systems 120 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., shared scanner module software, subscription module software, database server software, database client software, communication software, etc.).

Shared scanner module 112 and subscription module 122 may include one or more modules or units to perform the various functions of present invention embodiments described below (e.g., reading the log, parsing the log, providing log data to subscribers, creating milestones/snapshots, creating bookmarks, saving transaction queue data and metadata, resuming after a shutdown, receiving change data, replicating the changes in target database 124, etc.). Shared scanner module 112 and subscription module 122 may be implemented by any combination of any quantity of software and/or hardware modules or units, and may reside within memory 30 of a source database server system, target database server system, client system, and/or other computer systems in communication with the source database server system for execution by processor 20.

A block diagram of a shared scanner module and one or more subscription modules according to an embodiment of the present invention is illustrated in FIG. 2. Shared scanner module 112 includes a reader 210, a parser 220, and in-memory transaction queues 230. The reader receives data from log 116 and provides the data to the parser. The parser analyzes the data, identifies transaction records, and adds each resulting record to the in-memory queue for its transaction. The parser may be configured to selectively process records of certain user defined types of transactions (e.g., only process changes to specified tables). The parser periodically records a snapshot 118 of transaction queue data older than a cutoff. The shared scanner module provides change data to one or more subscriptions modules. In response to the change data, each subscription module takes one or more actions (e.g., replicating the changes in a target database). The parser can read the snapshots (e.g., upon restart). In addition, a subscription module may have its own reader and parser and use snapshots recorded by the shared scanner module.

According to an embodiment of the present invention, the log record parser of the shared scanner module marks periodic occasions, referred to as "milestones." An example default interval between milestones (the "milestone interval") is sixty minutes. At each milestone, the parser considers whether to create a snapshot containing the transaction queue data older than a cutoff. The cutoff is a log position of a record that was read and parsed a pre-defined number of milestones back, and it is the position from which log re-reading will commence if the snapshot is used. This pre-defined number of milestones is referred to as the "flashback interval" or "N". Log records will be older than the cutoff if they are still in the transaction queues N milestones later. The flashback interval can be determined based upon, e.g., how many minutes or hours worth of log it is acceptable to re-read. An example default flashback interval is two. A flashback interval of two and a milestone interval of one hour together guarantee that if the most recent possible snapshot is used, the log reader will not have to re-read more than three hours worth of log data.

Figure 3A:
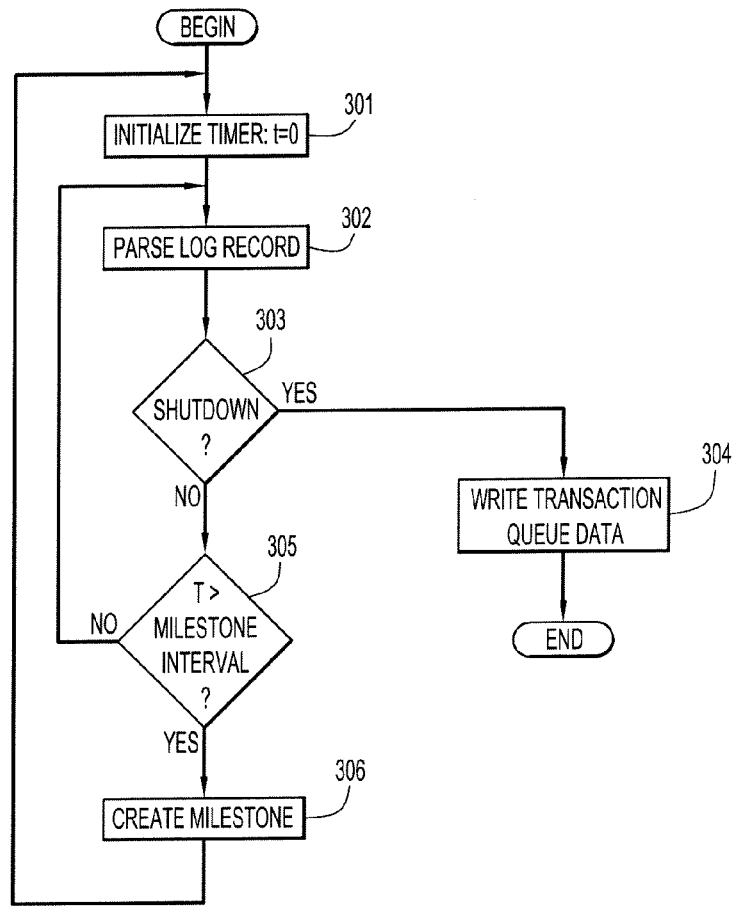
FIG. 3A is a procedural flow chart illustrating an example manner of determining milestone intervals according to an embodiment of the present invention.

A manner in which a parser (e.g., the parser of shared scanner module 112 via source database server system 110) determines milestone intervals according to an embodiment of the present invention is illustrated in FIG. 3A. Initially, the parser starts a timer (e.g., sets t=0) at step 301. The parser receives and parses a record at step 302. At step 303, the parser determines whether it should shutdown (e.g., checks whether a shutdown command has been received, whether it is time for a scheduled shutdown, etc.). If the parser determines that it should shutdown, it persists the transaction queue data and metadata at step 304 and the process terminates. Otherwise, the parser checks whether a milestone interval has elapsed since the timer started (e.g., checks whether t is greater than the milestone interval). If a milestone interval has elapsed, the parser creates a milestone at step 306 and returns to step 301 to restart the timer. Otherwise, the parser returns to step 302 and parses the next log record.

Figure 3B:
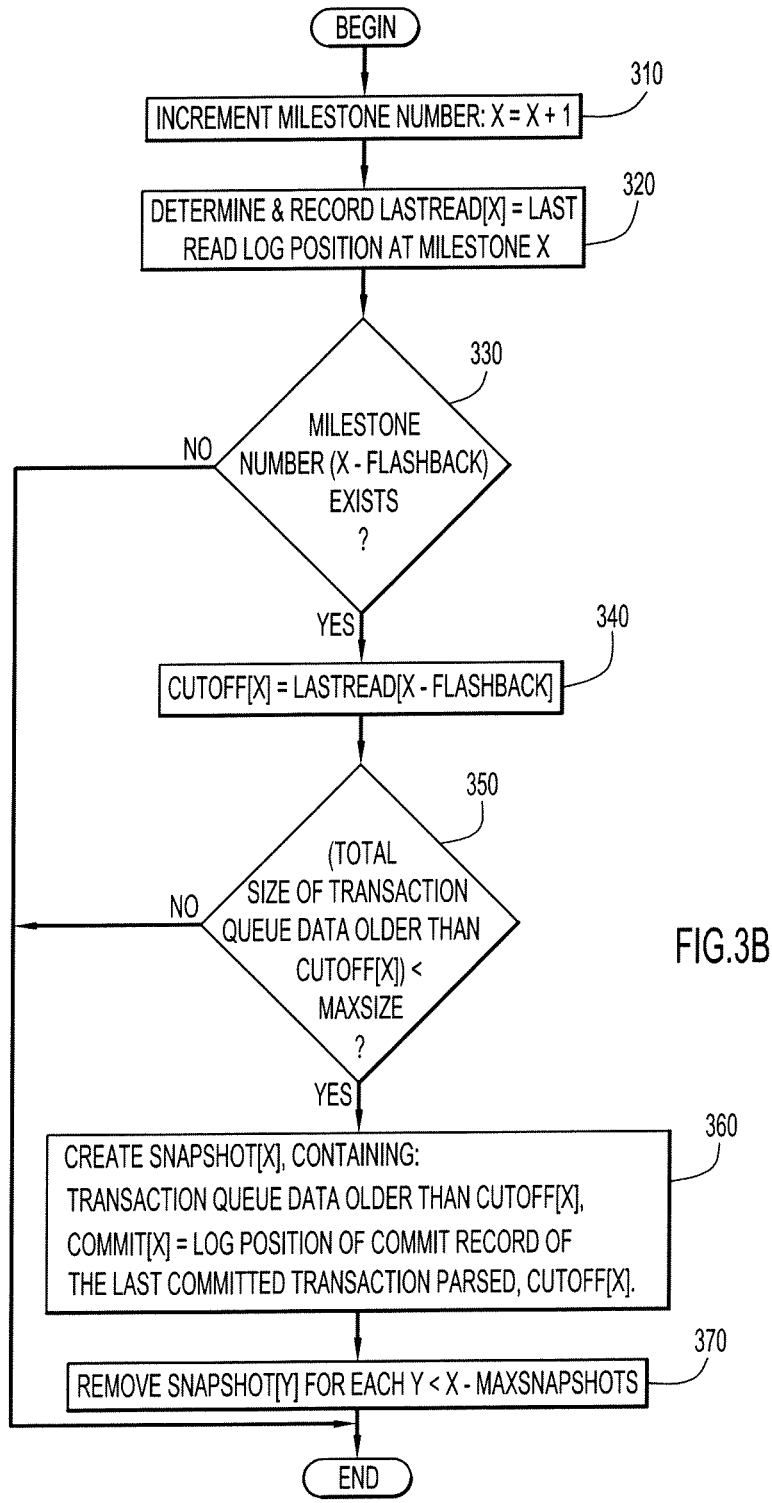
FIG. 3B is a procedural flow chart illustrating an example manner of creating a milestone according to an embodiment of the present invention.

A manner in which a parser (e.g., the parser of shared scanner module 112 via source database server system 110) creates a milestone according to an embodiment of the present invention is illustrated in FIG. 3B. When the parser determines that a milestone interval has elapsed since the previous milestone, it increments the milestone number (e.g., a count of the number of milestones so far) at step 310.

At step 320, the parser records the position of the last log entry it has parsed. This log position is denoted LASTREAD [X], where X is the milestone number.

At step 330, the parser determines whether a milestone exists for milestone number X−FLASHBACK, where FLASHBACK is the flashback interval ("FLASHBACK"). If not (e.g., because there have been fewer than or only FLASHBACK milestones so far), then no snapshot is taken, and the current milestone is finished.

If the milestone number is greater than the flashback interval, the parser determines the cutoff for a snapshot at the current milestone at step 340. The cutoff for a snapshot at milestone X is denoted CUTOFF[X] and is given by LASTREAD[X−FLASHBACK], the log position of the last record parsed at milestone number X−FLASHBACK.

At step 350, the parser computes the total size of the in-memory transaction queue data that is older than (i.e., corresponds to a log position that precedes) CUTOFF[X]. If the total computed size is greater than a predetermined MAXSIZE, then no snapshot is taken and the current milestone is finished. An example default MAXSIZE is ten megabytes. Limiting the size of a snapshot avoids any significant performance penalty in taking a snapshot.

If the total computed size is within MAXSIZE, the parser creates a snapshot for the current milestone at step 360. The parser writes CUTOFF[X] and the transaction queue data corresponding to log positions preceding CUTOFF[X] to the snapshot.

In addition, the parser determines the log position of the commit record for the last committed transaction the parser has processed (e.g., delivered to the subscriptions by the shared parser or applied against the target by a subscription parser). This is referred to as the snapshot commit position, denoted COMMIT[X] and is written to the snapshot. The snapshot commit position is used to determine if a parser can use the snapshot. A transaction queue snapshot will only contain data for uncommitted transactions. This is because once a transaction commits, the data is sent to the target to be applied and is not saved. Because of this, a parser does not use a snapshot if it still needs data for transactions that committed before the snapshot was taken.

At step 370, the parser deletes (cleans up) the oldest snapshots if there are more than the maximum number to retain (MAXSNAPSHOTS) in order to not consume too much disk space. Alternatively, the parser can delete any snapshots taken more than MAXSNAPSHOT milestones before the current milestone. An example default value of MAXSNAPSHOTS is twenty.

A manner of restoring a parser's transaction queues (e.g., the parser of shared scanner module 112 via source database server system 110) according to an embodiment of the present invention is illustrated in FIG. 4. When the parser starts, it first determines if its own transaction queues were saved entirely during the last shutdown. If so, it restores the saved transaction queue at step 410. The parser can then start reading the log from the last log record it read previously. In other words, it will not have to re-scan any log records.

If complete transaction queues are not available, the next best choice is usually to load the most recent snapshot that that parser can use. At step 420, the parser determines if there are any snapshots that it has not yet considered using, and, if so, determines the milestone number X of the most recent untried snapshot at step 422.

At step 424, the parser determines if the log position of the commit log record for the last transaction it processed (known, e.g., from the parser's last bookmark) is later than the snapshot commit position, COMMIT[X]. If it is, the parser can use the snapshot. The parser then determines at step 425 whether using the snapshot would result in reading from farther back in the log than just reading from the parser restart position. If so, the parser gives up on using any snapshots and proceeds to step 430. Otherwise, it primes its transaction queues with the data from the snapshot at step 426, and instructs the log reader to start reading the log from the cutoff for that snapshot, CUTOFF[X]. If the parser determines at step 424 that it cannot use the current snapshot, it returns to step 420 to look for another.

If the parser determines at step 420 that there are no possibly usable snapshots at or determines at step 425 that using a snapshot would result in reading from farther back in the log than just reading from the parser restart position, it proceeds to step 430 and resorts to re-reading the log from the parser restart position, i.e., the position of the oldest log record of the oldest uncommitted transaction, until it sees the commit log record for the last transaction applied.

Once the parser reaches the commit log record for the last transaction applied it can process new transactions. For example, the shared scanner module provides consumers transactions that were not previously replicated, or a subscription parser applies new transactions to the target database.

An example illustrates writing snapshots and restarting a parser using a snapshot according to an embodiment of the present invention. In this example, the milestone interval is sixty minutes; the flashback interval is two; the maximum snapshot size is ten megabytes; and the maximum number of snapshots retained is twenty. Once every hour, a milestone will occur and the shared scanner module's parser will:

1. Save the latest log position from the log reader as the restart position/cutoff position. This will be used at milestone X+2, where X is the current milestone number.

2. Determine if it can create a snapshot for milestone X−2: Iterate through the transaction queues, totaling up the size of log entries for all transactions records having a log position before the cutoff position. If the total is less than 10 MB, then create the snapshot. Save the log position of the commit record of the last committed transaction that was parsed as the snapshot commit position. For any transaction which has log entries that are before the cutoff position, save the transaction metadata and the log entries that are before the cutoff position.

3. Cleanup: Remove any snapshots that are older than X−20.

Upon restart, if a log parser cannot restore its own saved transaction queues, it will see if there is a snapshot it can use. The log parser will compare the log position of the commit log record for the last transaction applied against the snapshot commit position, starting with the latest snapshot and going back in time. It will use the newest snapshot for which the log position of the commit log record for the last transaction applied is greater than or equal to the snapshot commit position. If it finds one worth using, it uses that snapshot to populate its transaction queues, and the cutoff position of the snapshot is given to the log reader as the log reader restart position. If it does not find a snapshot worth using, then it gives the log position of the oldest log record of the oldest uncommitted transaction to the log reader as the restart position.

Figure 5:
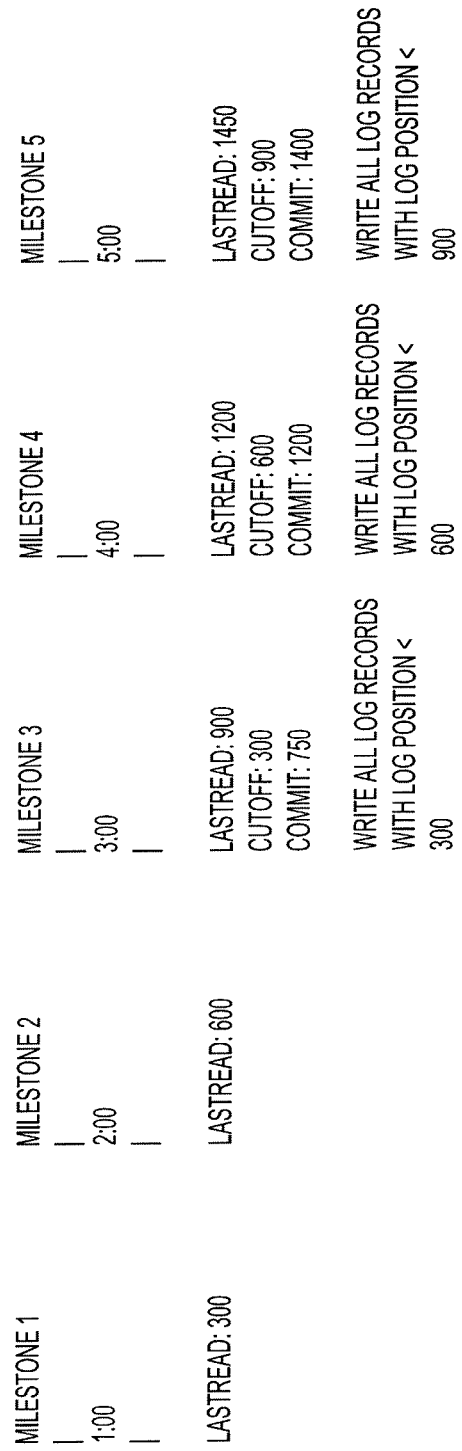
FIG. 5 is an example timeline illustrating snapshot information at a sequence of milestones according to an embodiment of the present invention.

An example timeline of the state of a system from the initial start according to an embodiment of the present invention initial is illustrated in FIG. 5. In this example, the milestone interval is sixty minutes; the flashback interval is two; the maximum snapshot size is ten megabytes; and the maximum number of snapshots retained is twenty. In addition, suppose for the purpose of this example that there is a transaction T1 where the LSN (Log Sequence Number) of the first log record is 100, and it never commits or aborts for the duration of this example.

Milestone 1 occurs at 1:00. At Milestone 1, the LSN (Log Sequence Number) of the last log record read from the log and added to the transaction queues was 300. This is saved as part of Milestone 1. No snapshot is taken because the system is still "priming" itself.

Milestone 2 occurs at 2:00. The LSN of the last log record read is 600. This is saved as part of Milestone 2. No snapshot is taken because the system is still "priming" itself.

Milestone 3 occurs at 3:00. The LSN of the last log record read is 900. This is saved as part of Milestone 3. The system is now "primed", so it determines if it can take a snapshot. The system uses the flashback interval to determine which previous milestone to get the cutoff position from. The flashback interval is 2, so the system gets the cutoff position from Milestone 1, at which the last read log record was 300. Therefore, the cutoff position at Milestone 3 is 300. The commit position is the log position of the last transaction that the parser saw commit prior to this milestone. In this example the commit position is 750 at milestone 3, but in general it can be anything less than the LSN of the last log record read. Since the cutoff position is 300, the system persists to disk all log records which are still in the transaction queues and have LSN less than 300. If the total size of all these log records were to exceed 10 MB, the system would abandon taking the snapshot, but in this example the size is less than 10 MB, so the snapshot is kept. The transaction queues are not empty because transaction T1 began at LSN 100 and has not committed or aborted yet. The snapshot would be empty if all transactions with an in-scope log record LSN less than 300 had already committed or aborted by the time the system reached this milestone, i.e. by the time the system was reading the log record with LSN 900.

Milestone 4 occurs at 4:00. The LSN of the last log record read is 1200. This is saved as part of Milestone 4. The system determines if it can take a snapshot. It uses the flashback interval to determine which previous milestone to get the cutoff position from. The flashback interval is 2, so the system gets the cutoff position from Milestone 2, at which the last read log record was LSN 600. Therefore, the cutoff position at Milestone 4 is 600. The commit position is 1200. Since the cutoff position is 600, the system persists to disk all log records having LSN less than 600. If the total size of all these log records were to exceed 10 MB, the system would abandon taking the snapshot, but in this example the size is less than 10 MB, so the snapshot is kept. The snapshot is also not empty because of transaction T1.

Milestone 5 occurs at 5:00. The LSN of the last log record read is 1450. This is saved as part of Milestone 5. The system determines if it can take a snapshot. The system uses the flashback interval to determine which previous milestone to get the cutoff position from. The flashback interval is 2, so the system gets the cutoff position from Milestone 3, at which the last read log position was LSN 900. Therefore, the cutoff position at Milestone 5 is 900. The commit position is 1400. Since the cutoff position is 900, the system persists to disk all log records having LSN less than 900. If the total size of all these log records were to exceed 10 MB, the system would abandon taking the snapshot, but in this example the size is less than 10 MB, so the snapshot is kept. The snapshot is also not empty because of transaction T1.

Now, suppose the source system crashes after milestone 5. Furthermore, suppose that a subscription B had applied on the target all transactions up to a transaction with a commit log record LSN of 1375. Subscription B restarts and a parser starts for it. This may be the shared parser that writes the snapshot, or it may be a private parser. In either case, the parser will see if there are any snapshots it can use to avoid having to start reading the logs at LSN 100 (the LSN of the earliest operation of the oldest open transaction, which in this example is transaction T1). The parser will first consider the snapshot taken at milestone 5 (the latest one). The subscription compares its commit position (1375) against the snapshot commit position (1400). The parser cannot use this snapshot because the subscription commit position is less than the snapshot commit position. This means the subscription still needs data for transactions that committed before LSN 1400, and the transaction queues don't have this data because they do not keep data for transactions once they commit. The log reader cannot start scanning at LSN 1400 because it would miss the data for these committed transactions.

As a result, the system determines if it can use the snapshot taken at milestone 4. The system can use this snapshot because the subscription commit position (1375) is greater than or equal to the snapshot commit position (1200). The parser loads the data from the snapshot into its transaction queues, after which the transaction queues contain all the data that is needed up to LSN 600. The log reader is then told to start reading from the log at LSN 600. Thus, an embodiment of the present invention enables the parser to start reading the log at position 600 instead of 100.

It will be appreciated that the embodiments described above and illustrated in the drawings represent only a few of the many ways of implementing embodiments for reducing re-reading of database logs by persisting long running transaction data.

The topology or environment of the present invention embodiments may include any number of computer or other processing systems (e.g., sources database server systems, target database server systems, client or end-user systems, etc.) databases, or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any commercially available or custom software (e.g., shared scanner module software, subscription module software, database software, communications software, etc.). These systems may include any types of monitors and input devices (e.g., keyboard, mouse, voice recognition, touch screen, etc.) to enter and/or view information.

It is to be understood that the software (e.g., shared scanner module software, subscription module software, database software, communications software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various source database server systems, target database server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., shared scanner module software, subscription module software, database software, communications software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other data storage systems (e.g., databases, files, arrays, data structures, etc.) to store information (e.g., logs, source databases, target databases, transaction queue data, snapshots, milestone/milestone metadata, bookmarks, etc.). The database systems may be implemented by any number of any conventional or other databases, data stores or storage structures (e.g., files, databases, data structures, data or other repositories, etc.). Any log record position scheme may be used (e.g., log sequence number, system change number, etc.).

The present invention embodiments may employ any number of any type of user interface (e.g., Graphical User Interface (GUI), command-line, prompt, etc.) for obtaining or providing information (e.g., configuring shared scanner module parameters, scheduling jobs, correcting faults, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.).

The present invention embodiments are not limited to the specific tasks, algorithms, parameters or network/environment described above, but may be utilized for reducing processing (e.g., replicating, monitoring, etc.) of any type of ordered (e.g., time ordered, priority ordered, etc.) data (e.g., transaction log data, network communication data, etc.) having a categorical attribute (e.g., transaction ID, customer ID, etc.). A milestone interval may be of any type (e.g., time interval, number of records processed, variable, etc.) or duration (e.g., seconds, minutes, hours, days, etc.; tens, hundreds, thousands, etc. of records; etc.). Snapshots may be created and/or used by any module or process in communication with a transaction queue (e.g., shared scanner module parser, subscription parser, a parallel snapshot module, etc.). A parser or snapshot module may use separate threads for reading/parsing and snapshot creation. Any parameter values (e.g., flashback interval, snapshot size limit, snapshot count limit, etc.) may be used and may be user configurable. Subscribers may take any action in response to change data (e.g., replication changes, correcting errors, raising alarms, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for processing database log records of a database transaction log comprising:
    at least one processor configured to:
        receive database log records of the database transaction log and process at least some of the received records;
        generate snapshots of the database log records, wherein each snapshot includes database log records for pending transactions, and a transaction is pending when at least one of the log records for the transaction remains to be processed; and
        in response to an interruption in processing of the database log records, utilize a selected snapshot to restore database log records for the pending transactions and resume processing of the database transaction log from a position succeeding the database log records of the selected snapshot.

2. The system of claim 1, wherein each snapshot is associated with log information for a corresponding committed transaction, and the processor is further configured to:
    compare a most recent committed transaction to the associated log information of the generated snapshots and select a snapshot based on the comparisons.

3. The system of claim 1, wherein the processor is further configured to record information pertaining to processed database log records at periodic occasions, and each of the snapshots is generated at one of the occasions based on the recorded information from a prior one of the occasions.

4. The system of claim 1, wherein processing the database log records comprises storing the records for pending transactions in corresponding transaction queues.

5. The system of claim 4, wherein restoring database log records comprises restoring the database log records to the corresponding transaction queues.

6. The system of claim 1, wherein the snapshot excludes database log records for pending transactions processed after a cutoff.

7. The system of claim 6, wherein the processor is further configured to utilize the database transaction log to restore the database log records for pending transactions processed after the cutoff.

8. A computer program product for processing database log records of a database transaction log comprising:
- a non-transitory computer readable storage medium having computer readable program code embodied therewith for execution on a first processing system, the computer readable program code comprising computer readable program code configured to:
  - receive database log records of the database transaction log and process at least some of the received records;
  - generate snapshots of the database log records, wherein each snapshot includes database log records for pending transactions, and a transaction is pending when at least one of the log records for the transaction remains to be processed; and
  - in response to an interruption in processing of the database log records, utilize a selected snapshot to restore database log records for the pending transactions and resume processing of the database transaction log from a position succeeding the database log records of the selected snapshot.

9. The computer program product of claim 8, wherein each snapshot is associated with log information for a corresponding committed transaction, and the computer readable program code is further configured to:
- compare a most recent committed transaction to the associated log information of the generated snapshots and select a snapshot based on the comparisons.

10. The computer program product of claim 8, wherein the computer readable program code is further configured to record information pertaining to processed database log records at periodic occasions, and each of the snapshots is generated at one of the occasions based on the recorded information from a prior one of the occasions.

11. The computer program product of claim 8, wherein processing the database log records comprises storing the records for pending transactions in corresponding transaction queues.

12. The computer program product of claim 11, wherein restoring database log records comprises restoring the database log records to the corresponding transaction queues.

13. The computer program product of claim 8, wherein the snapshot excludes database log records for pending transactions processed after a cutoff.

14. The computer program product of claim 13, wherein the computer readable program code is further configured to utilize the database transaction log to restore the database log records for pending transactions processed after the cutoff.

* * * * *